United States Patent [19]

Tetley et al.

[11] Patent Number: 4,847,503

[45] Date of Patent: Jul. 11, 1989

[54] RADON PROGENY DETECTOR FOR MEASURING ATTACHED AND UNATTACHED FRACTIONS

[75] Inventors: William C. Tetley, Syracuse; Bruce A. Cummings, Baldwinsville; Daniel R. Westcott, North Syracuse, all of N.Y.

[73] Assignee: RAD-X-Ltd., Syracuse, N.Y.

[21] Appl. No.: 184,758

[22] Filed: Apr. 22, 1988

[51] Int. Cl.⁴ .............................................. G01T 1/02
[52] U.S. Cl. .................................. 250/435; 250/253; 250/255; 250/472.1
[58] Field of Search ............. 250/435, 255, 253, 472.1

[56] References Cited

U.S. PATENT DOCUMENTS 4,570,494  2/1986  Dunn et al. ...................... 73/863.22

Primary Examiner—Carolyn E. Fields
Attorney, Agent, or Firm—Wall and Roehrig

[57] ABSTRACT

A radon progeny detector for measuring the concentration of attached and unattached factions in an atmosphere. A laminar flow of air is drawn sequentially through a diffusion battery and a particle trap. Unattached progeny having a particle size of 10 nm or less are captured upon the plates of the diffusion battery. Attached progeny is passed into the trap where the attached progeny is captured by a filter. Film strips for recording tracks produced by alpha particles emitted by the progeny are mounted in both the diffusion battery and the particle trap to record the concentrations of both fractions.

14 Claims, 1 Drawing Sheet

RADON PROGENY DETECTOR FOR MEASURING ATTACHED AND UNATTACHED FRACTIONS

BACKGROUND OF THE INVENTION

This invention relates to a radon detector and, in particular to a small, compact instrument for measuring the concentration of both attached and unattached radon progeny in an atmosphere.

Radon is a disintegrating by-product of radium that is oftentimes found trapped within the ground in many geographical locations. As an inert gas, radon has a relatively low chemical interaction rate and, as a result, it can diffuse through soil and thus accumulate within buildings or the like which are situated over areas of high radon concentration. Continual human exposure to certain levels of radon progeny have been shown to be harmful to one's health. The progeny of radon can be divided into two general groups or factions. The first fraction involves what is referred to as "unattached" progeny wherein airborne progeny is carried along by ultra fine aerosol particles, each having a size of 10 nm or less. The second fraction is referred to as "attached" progeny wherein the progeny is attached to a micron size or larger dust particle.

Radon progeny generally enters into a home or dwelling through the basement or lower floors where it can accumulate to critical levels. The principle health threat from radon comes from the fine unattached progeny which have greater mobility over its attached counterpart and is more easily deposited on human lungs. The health risk posed exposure to unattached progeny is further increased in buildings where smokers reside. Similarly, homes having gas ranges, air purifiers and the like which can significantly alter the aerosol distribution in the atmosphere also tend to increase the concentration of unattached progeny fractions and thus increase the risk factor. It has therefore become extremely important to be able to detect both the presence of attached and unattached progeny fractions in an enclosed structure such as a home so that the risks involved can be accurately assessed.

In U.S. Pat. No. 3,922,555 there is disclosed a portable device for use in uranium mines that is able to detect the presence of alpha particles emitted by two daughters of radon. The device has a hollow housing and a small fan for drawing atmospheric air into the housing. A filter is positioned within the chamber for capturing and retaining progeny particles found in the air flow. A pair of screens are placed between the filter and a radiation detector. One screen is arranged to pass alpha particles emitted by a first progeny, radium A, while blocking radiation emitted by other progenies. The second screen is arranged to pass alpha particles emitted by a second progeny, radium C', while similarly blocking radiation emitted by other progenies. The detector uses a film that is capable of recording tracks of alpha particles that pass through the two screens. The number or density of the tracks recorded over the two screened areas are then measured and the concentration of the A and C' progenies present in the atmosphere computed from these measurements.

A device for testing air filtration systems for removing radon progeny from an air flow is also disclosed in U.S. Pat. No. 3,614,421. This type of filtration system is intended to operate as a high efficiency device for capturing and retaining most, if not all the radon progeny found in a moving air stream. Radon progeny detectors are placed on the upstream and downstream side of the filter system which provide information concerning the concentration of radon progeny approaching and leaving the filter area. Each detector contains a capture chamber connected to a vacuum pump which draws a sample flow of atmosphere through the filter which captures the radon progeny. Alpha particles emitted by the trapped radon progeny are recorded as tracks in a cellulose based film. Valuable information concerning the effectiveness of the filtering system is thus gained by simply comparing the measured concentration of tracks recorded by the upstream detector with those recorded by the downstream detector.

Passive radon detectors operating on the same general principles as those described in the above noted patents, are also set forth in U.S. Pat. Nos. 4,704,537; 4,518,860; 4,385,236; and 3,665,194.

Although all the above noted detectors are fully capable of detecting and measuring levels of decaying by-products, such as radon, these devices are nevertheless not capable of distinguishing between the concentrations of unattached and attached fractions. Accordingly, the ratio of progeny present to radon gas (F) in a sample of air, as well as the ratio of the unattached progeny to the total progeny (f) can only be inferred from average measurements. These inferred levels, for an average home, may vary significantly so that the risk factor is correspondingly either over or under estimated by a considerable amount.

SUMMARY OF THE INVENTION

It is therefore an object of the present invention to improve apparatus for detecting the presence of progenies of radon and other decaying products.

It is a further object of the present invention to measure the concentration of both attached and unattached progeny of radon in an atmosphere.

A still further object of the present invention is to provide a small, compact, inexpensive device that is capable of measuring concentrations of both attached and unattached progeny in an enclosed structure such as a home or the like.

Another object of the present invention is to accurately determine the health risk posed in an enclosed atmosphere by measuring the progenies of radon, particularly in environments containing devices that might significantly alter the aerosol distribution within the atmosphere.

These and other objects of the present invention are attained by means of a radon progeny detector having a diffusion battery connected to a particle trap. A small pump is arranged to draw a laminar flow of ambient air over the plates of the battery wherein ultra fine, unattached fractions of radon progeny diffuse onto the plates of the battery. Larger size attached fractions are drawn with the flow through the battery into the particle trap where they are captured by means of a filter. Film strips are mounted in both the diffusion battery and the particle trap to record tracks of alpha particles emitted by both the attached and the unattached fractions. The concentration of each fraction is determined from the density of the tracks recorded on the film strips. Further information relating to the size distribution of the unattached fraction is determined by the location of the tracks along the film strip mounted in the diffusion battery.

BRIEF DESCRIPTION OF THE DRAWINGS

For a better understanding of these and other objects of the present invention, reference is made to the following detailed description of the invention which is to be read in conjunction with the accompanying drawings, wherein.

DETAILED DESCRIPTION OF THE INVENTION

Figure 1:
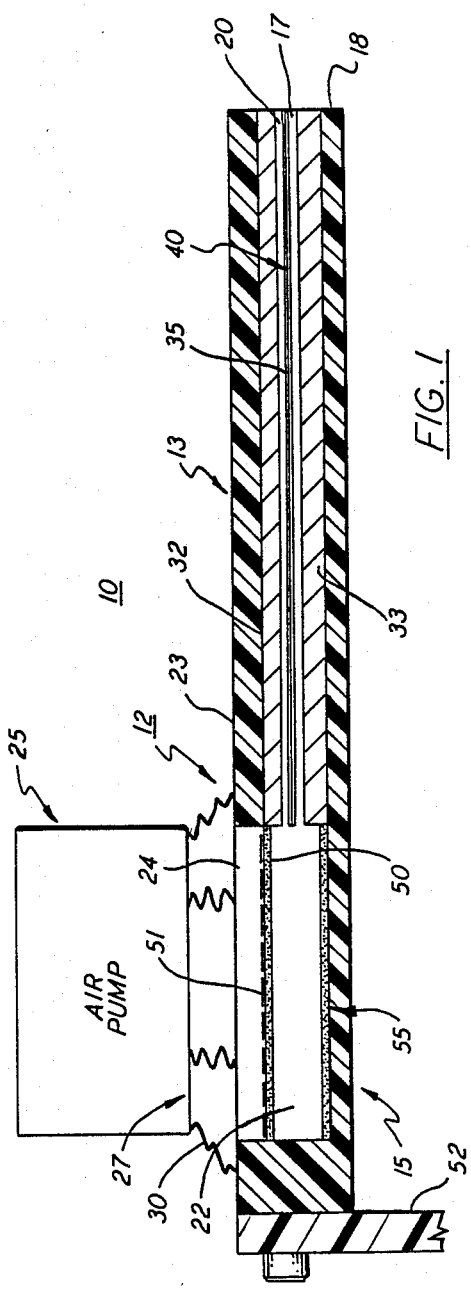
FIG. 1 is a side elevation in section showing a compact device for detecting both attached and unattached progeny of radon or other similar products.

Turning now to FIG. 1 there is shown a radon progeny detector, generally referenced 10, that is capable of measuring the concentration of both attached and unattached fractions in an atmosphere such as air. As noted above, by being able to measure both attached and unattached fractions in a large variety of aerosol environments, valuable information can be gathered relating to the health risks to occupants of buildings and the like. The present detector includes a housing 12 that contains two main sections; a diffusion battery 13 and a particle trap 15. The housing is molded or otherwise formed of plastic and has an opening 17 in one side wall 18 thereof that leads to an elongated flow passage 20 which passes horizontally through the diffusion battery 13. Tee flow passage 20 opens into an expanded chamber 22 located within the particle trap. The expanded chamber extends upwardly in a vertical direction and passes out of the housing at a discharge opening 24 from in the top wall 23.

A small air pump 25 is mounted upon the housing by means of a vibration absorbing bracket 27 of any suitable design having springs and/or dampers for isolating the pump from the body of the housing. The pump is mounted directly over the discharge opening 24 of the particle trap. An air tight bellows 30 surrounds the discharge opening and serves as an airtight conduit for connecting the suction side of the pump and the trap. The pump, in practice, is a small, two-watt device that is adapted to draw a laminar flow of ambient air through the diffusion battery and the particle trap.

The diffusion battery contains a pair of parallel spaced apart, plates 32 and 33 that form the top and bottom walls respectively of the flow passage 20. The two opposing side walls of the passage are each provided with a groove 35 that extends horizontally along the entire length of the passage. An elongated film strip 40 is slidably received within the grooves so that the strip is positioned about midway between the two plates 32 and 33. The plates can be formed of any suitable material upon which fine, unattached radon progeny will readily adhere. The film strip is formed of a sheet of track registration material such as cellulose nitrate or allyl dyglycol carbonate which is capable of recording damage tracks produced by alpha particles emitted by radon progeny captured in the battery. It should be noted that in the present arrangement, the film strip 40 also acts as a plate in the battery so that it, like the other plates, provides surface areas upon which the unattached progeny can adhere.

Figure 2:
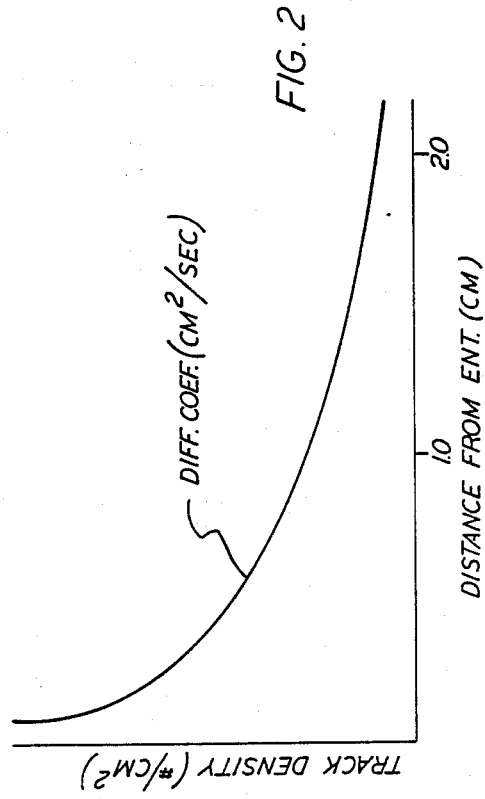
FIG. 2 is a graphic representation wherein the density of tracks produced by alpha particles emitted by unattached particles captured within the diffusion battery of the present apparatus are plotted against their distance from the entrance of the diffusion battery flow passage for particles having a single diffusion coefficient.

The length of the flow passage 20 is controlled so that unattached progeny, having a particle size of 10 nm and below will have sufficient time to diffuse upon the plates of the battery as the laminar stream of air moves thereover. Smaller unattached particles, having a higher diffusion coefficient, will diffuse more readily within the entrance region of the flow passage while larger particles will diffuse further along the passage in relation to their relative sizes. Accordingly, the density of the tracks recorded by the film strip will not only provide valuable information as to the concentration of unattached particles that are present, but also the size distribution (diffusion coefficient) of these particles. FIG. 2 illustrates a typical track density distribution produced by particles having an average diffusion coefficient of about 0.05 cm$^2$/sec.

As can be seen from the graph, a high percentage, or about 90 percent, of these unattached progeny are captured within a region that is 1 cm or less from the battery entrance. About ten percent of the unattached particles are carried further along by the flow, however, a preponderance of these are eventually captured before they enter the particle trap.

A similar exponential curve can be developed for a film strip that is exposed to unattached progeny having varying diffusion coefficients. By using the well known least square fit technique the average unattached diffusion coefficient can be found for the flow drawn through the diffusion battery. The average diffusion coefficient value will provide valuable information concerning health risks.

The method may also include the determination of the ratio of unattached radon progeny to the total amount of radon progeny.

The accuracy of the alpha particle track measurements in the present device is dependent, to a large extent, on the number of tracks recorded in the film. To generate a sufficient number of tracks required for precise measurement, the battery should remain in continuous operation within a test atmosphere for about one week. For a radon gas level of about 4 pCi/l, where $F=0.5$, $f=0.10$ and a detector geometry factor of about 0.19, the number of tracks recorded on the film will be about 660 per day or in excess of 4,500 per week, which is sufficient data upon which to base precise measurements.

Radon progeny attached to particles having a size of 10 nanometers or larger are drawn by the pump into the expanded chamber 22 of particle trap 15. A filter 50, capable of capturing the attached progeny particles, is suspended in the chamber upon a suitable grid network 51. The filter extends across both the width and the breadth of the chamber so that the flow of air drawn by the pump through the chamber is caused to pass through the filter. A second track registering film strip 55 is seated upon the floor of the chamber adjacent to the filter. Here again, alpha particles emitted by the attached progeny captured by the filter are recorded on the film strip. Although not shown, an access door is provided in the housing which permits the film strip 55 and the filter 50 to be removed and replaced within the assembly.

As seen in FIG. 1 the present device is specifically designed and operated in a manner such that radon progeny attached to non-respirable particles will not be drawn into the detector. For purposes of this disclosure, a non-respirable particle will be considered as a particle having a size of 10 microns or more. To this end the detector is suspended in an inverted position from a top support bracket 52. When in an inverted position the flow path 20 is vertically disposed and the entrance 17 to the flow path points downwardly. The flow rate through the detector is controlled so that only particles that are finer than 10 microns will be drawn upwardly into the diffusion battery. Accordingly, only radon progeny representative of the progeny that would normally be inhaled by a human being will be detected by the present instrument. All other non-respirable progeny are rejected.

As should be evident from the disclosure above, the apparatus of the present invention is able to measure the concentration of both attached and unattached radon progeny or any other progeny in ambient air surrounding the detector. By determining the concentration of both attached and unattached progeny, the effects of the progeny upon health can be accurately ascertained rather than inferred, as is the case in most prior art devices. In addition, the distribution of the more dangerous unattached particles can be determined thereby providing further useful information concerning health risks and the like.

While the present invention has been described with specific references to the structure disclosed herein, it is not confined to the details set forth and this application is intended to cover any modifications or changes as may come within the scope of the following claims.

What is claimed is:

1. A radon progeny detector that includes a diffusion battery that is in fluid flow communication with a trap means, a pump means connected to the trap means for drawing a laminar flow of air through said diffusion battery into said trap means whereby unattached radon progeny adheres to the walls of the diffusion battery and are captured therein and attached radon progeny pass into the trap means, first recording means positioned in the diffusion battery for detecting ionizing particles emitted by the unattached progeny captured in the diffusion battery, a capture means in the trap means for capturing attached radon progeny drawn into said trap means, and a second recording means in said trap means for detecting ionizing particles emitted by the attached progeny captured in said trap means.

2. The detector of claim 1 that further includes a housing for enclosing the diffusion battery, the trap means and the pump means.

3. The detector of claim 2 having a support means for suspending the housing so that air passes upwardly through the diffusion battery in a vertical direction whereby radon progeny attached to non-respirable particles are not drawn into the battery.

4. The detector of claim 1 wherein the battery includes a plurality of parallel plates over which the laminar flow passes, one of said plates being a film means for recording traces of alpha particles emitted by said unattached radon progeny.

5. The detector of claim 4 wherein said film means is an elongated strip of film extending from an air entrance to the battery to an air entrance to the trap means whereby the particle size distribution of the unattached radon progeny can be determined by the density and location of the ionizing particle traces recorded on the film strip.

6. The detector of claim 5 wherein the diffusion battery has a flow path over the plates of a length wherein unattached radon progeny having a particle size of 10 nm or less will diffuse upon the plates.

7. The detector of claim 1 wherein the trap means includes a filter for capturing attached radon progeny and a film strip positioned parallel to the filter for recording traces of the ionizing particles emitted by the attached progeny.

8. The detector of claim 2 that further includes a bracket means for resiliently mounting the pump means upon the housing wherein vibrations from the pump are prevented from being transmitted to the housing.

9. A method of detecting attached and unattached radon progeny in an atmosphere that includes the steps of drawing a laminar flow of atmosphere sequentially through a diffusion battery and a trap such that unattached radon progeny adheres to the walls of the diffusion battery and attached radon progeny pass into the trap, capturing attached progeny within the trap, detecting the concentration of alpha particle emissions from the unattached radon progeny captured in the diffusion battery, detecting the concentration of alpha particle emissions from the attached radon progeny captured in the trap.

10. The method of claim 9 that includes the further step of recording traces of alpha particle emissions captured in the diffusion battery on a first film strip and alpha particle emissions in the trap on a second film strip.

11. The method of claim 10 that further includes the step of placing the first film strip along a laminar flow path passing through the diffusion battery and determining the diffusion coefficient and size distribution of unattached radon progeny by the density and location of the traces recorded along the length of said first film strip.

12. The method of claim 9 that further includes the step of determining the ratio of unattached radon progeny to the total amount of radon progeny.

13. The method of claim 11 that further includes the step of determining the average unattached diffusion coefficient for the tracks registered on the first film strip.

14. The method of claim 9 that includes the further step of aligning the flow path through the diffusion battery in a vertical position and regulating the rate of flow through the diffusion battery and trap so that non-respirable particles having a size of 10 microns or greater are not drawn into the diffusion battery.

* * * * *